US012187181B2

(12) United States Patent
Inoue et al.

(10) Patent No.: US 12,187,181 B2
(45) Date of Patent: Jan. 7, 2025

(54) VEHICLE

(71) Applicant: YAMAHA HATSUDOKI KABUSHIKI KAISHA, Iwata (JP)

(72) Inventors: Takehiro Inoue, Shizuoka (JP); Atsushi Kamo, Shizuoka (JP); Kenichi Muramatsu, Shizuoka (JP); Yoko Takagi, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 0 days.

(21) Appl. No.: 18/338,168

(22) Filed: Jun. 20, 2023

(65) Prior Publication Data

US 2023/0331141 A1      Oct. 19, 2023

Related U.S. Application Data

(63) Continuation-in-part of application No. PCT/JP2021/047475, filed on Dec. 22, 2021.

(30) Foreign Application Priority Data

Dec. 22, 2020   (JP) ................................. 2020-212432

(51) Int. Cl.
*B60Q 1/00*      (2006.01)
*B60Q 1/14*      (2006.01)
(Continued)

(52) U.S. Cl.
CPC .......... *B60Q 1/0011* (2013.01); *G02B 6/0006* (2013.01); *B60Q 1/1415* (2013.01); *B62J 6/022* (2020.02)

(58) Field of Classification Search
CPC .. B60Q 1/0011; B60Q 1/1415; G02B 6/0006; B62J 6/022
See application file for complete search history.

(56) References Cited

U.S. PATENT DOCUMENTS

| 2012/0025962 | A1  | 2/2012 | Toll |
| 2018/0252380 | A1* | 9/2018 | Kitayama ............ B60Q 1/0035 |
| 2020/0233292 | A1* | 7/2020 | Rudy ................. G03B 21/2033 |

FOREIGN PATENT DOCUMENTS

| JP | H1143088 A   | 2/1999 |
| JP | 2018-144573 A | 9/2018 |

(Continued)

*Primary Examiner* — Evan P Dzierzynski
*Assistant Examiner* — Jessica M Apenteng
(74) *Attorney, Agent, or Firm* — Rabin & Berdo, P.C.

(57) ABSTRACT

A vehicle having: a vehicle body; a plurality of light-emitting parts; a light source configured to output a laser beam to the light-emitting parts; a fiber optic cable that constitutes a part of a laser beam path, the fiber optic cable having a most upstream branch portion; a single shared laser driver board controlling laser beam source elements in the single light source; and at least one laser light-emission-manner converter, each disposed in, or downstream of, the most upstream branch portion, to thereby cause each light-emitting part downstream from said each light-emission-manner converter to change a light-emission manner thereof. The laser light-emission-manner converter and/or the single shared laser driver board are at least partially disposed in an in-body covered region, which is disposed further downward than, and in a plan view of the vehicle overlaps, any of a fuel tank, a dummy tank, a foot board, and a seat.

7 Claims, 4 Drawing Sheets

(51) Int. Cl.
*B62J 6/022* (2020.01)
*F21V 8/00* (2006.01)

(56) References Cited

FOREIGN PATENT DOCUMENTS

| | | | |
|---|---|---|---|
| JP | 2019204715 | A | 11/2019 |
| JP | 2020170689 | A | 10/2020 |
| WO | 2019/044404 | A1 | 3/2019 |

* cited by examiner

FIG.2
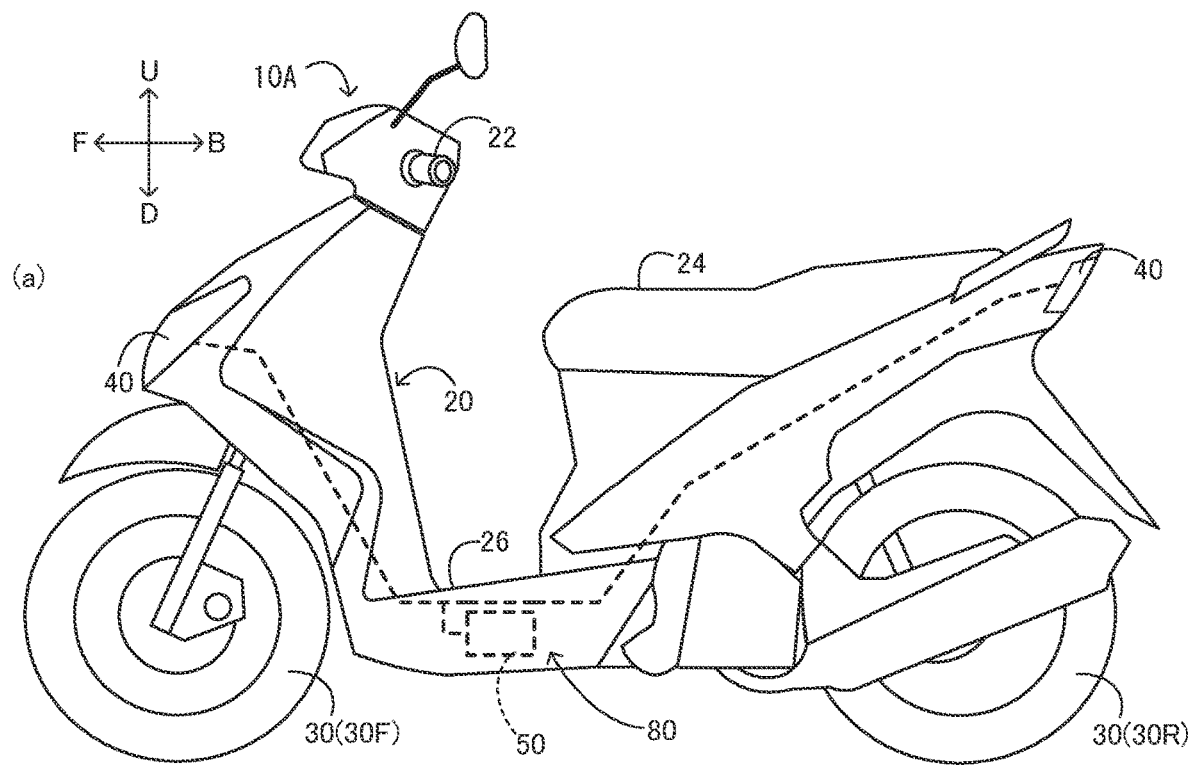
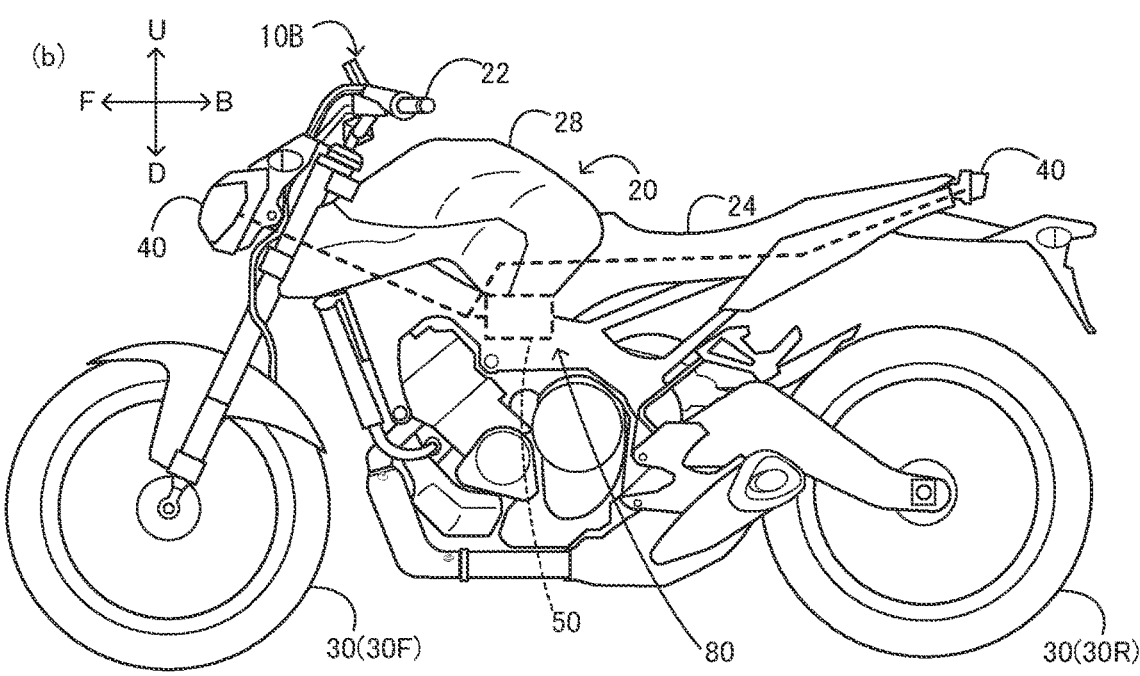

FIG.4
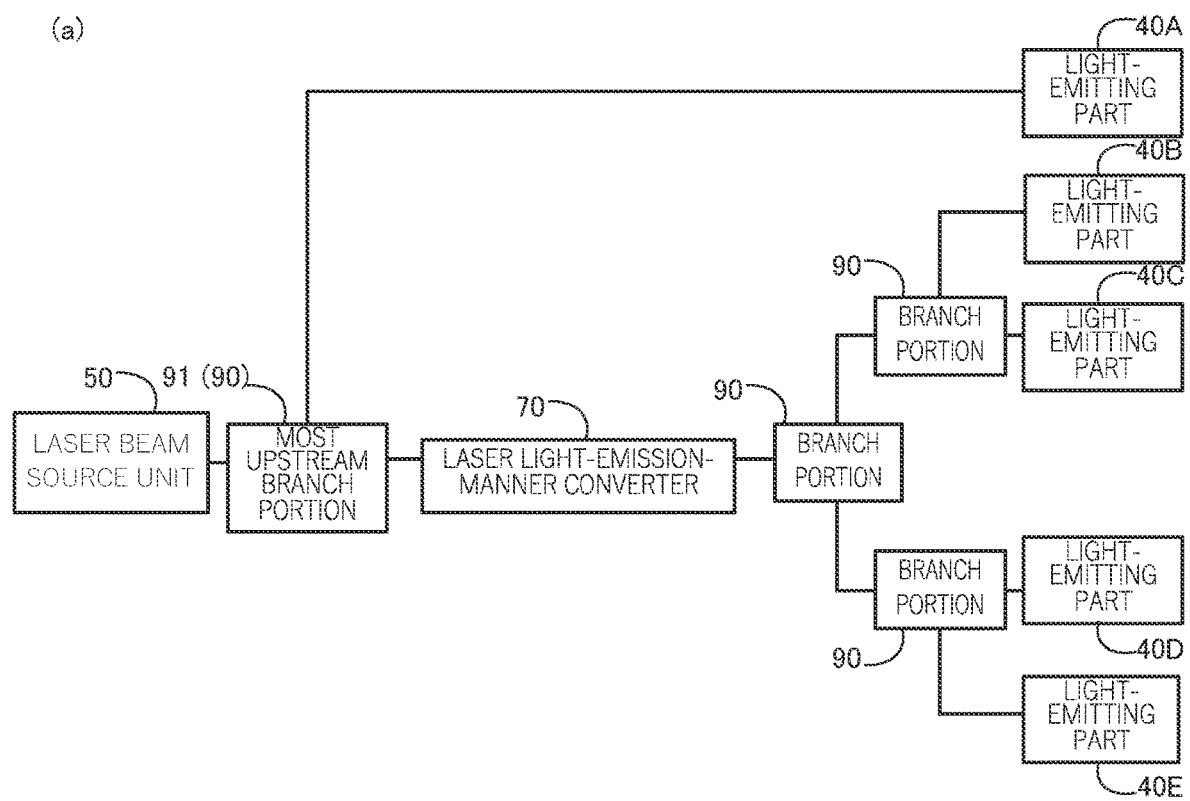
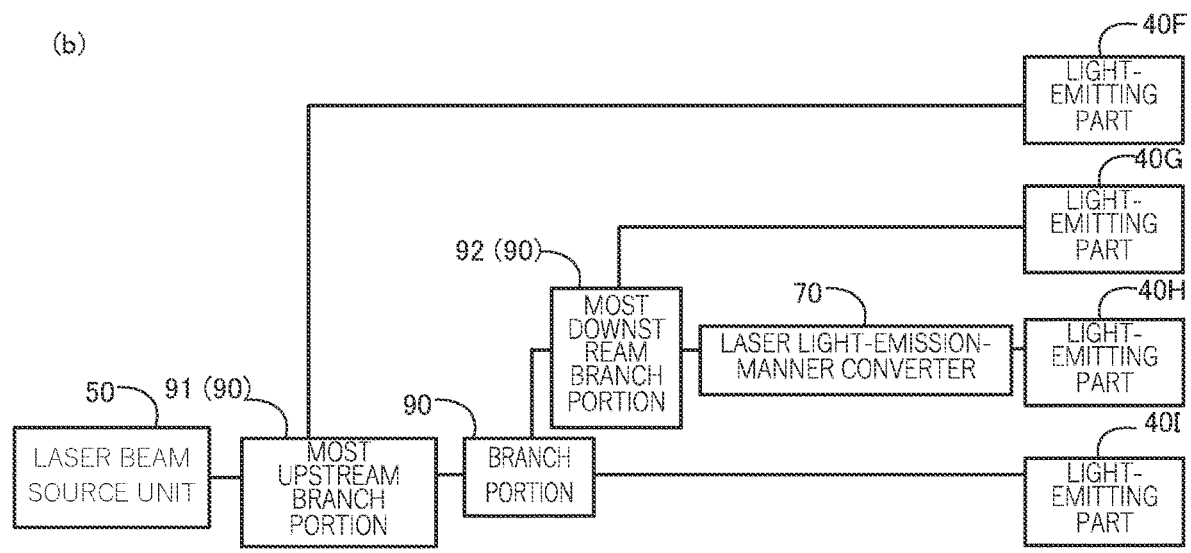

VEHICLE

CROSS-REFERENCE TO RELATED APPLICATIONS

This is a continuation-in-part application of International Application PCT/JP2021/047475, filed on Dec. 22, 2021, which claims priority from Japanese Patent Application No. 2020-212432, filed on Dec. 22, 2020. The contents of the applications are incorporated herein by reference.

TECHNICAL FIELD

The present teaching relates to a vehicle that is a leaning vehicle or a straddled vehicle.

BACKGROUND ART

A vehicle with a lighting equipment system that uses a laser beam is shown in, for example, Patent Literature 1 (PTL 1). The vehicle according to PTL 1 is a straddled vehicle. The straddled vehicle of PTL 1 is configured to lean left and right.

A lighting equipment system includes a laser beam source, a light guide part for guiding light from the laser beam source to a desired position, and a plurality of light-emitting parts disposed at the distal end of the light guide part, the plurality of light-emitting parts being configured to radiate light from the light guide part toward the surroundings of the vehicle. The plurality of light-emitting parts includes light-emitting parts that emit light in different manners.

The laser beam source has a plurality of laser elements that constitutes an integrated device for supplying light to the plurality of light-emitting parts. In order for the plurality of laser elements to emit light in different light-emission manners, a plurality of drive circuits is required. The laser beam source is disposed between a seat and a swing arm in a side view. This allows the laser beam source, which has a relatively heavy weight, to be closer to the center of gravity of a vehicle body. Aiming for centralization of the vehicle's mass at a location closer to the center of gravity of the vehicle body can be attempted.

CITATION LIST

Patent Literature

PTL 1: Japanese Patent Application Laid-Open No. 2018-144573

SUMMARY OF INVENTION

Technical Problem

The present teaching aims to efficiently use an equipment installation space in a vehicle that is a leaning vehicle or a straddled vehicle, to prevent or suppress a size increase of the vehicle, while enabling adoption of a laser beam source.

Solution to the Problem

To attain the foregoing aim, the inventors of the present teaching conducted studies as follows.

When a rider operates a leaning vehicle to make a turn for example, the rider needs to shift their weight. A straddled vehicle travels with a rider straddling a seat. Thus, a vehicle that is the leaning vehicle or the straddled vehicle is configured to have a smaller vehicle width than that of a typical four-wheeled vehicle having a cabin. In general, maneuverability, agility, and simplicity are required of a vehicle that is the leaning vehicle or the straddled vehicle. Thus, a desire for downsizing and weight reducing of the vehicle that is the leaning vehicle or the straddled vehicle is very high. Components in a vehicle body are arranged densely. Especially in the vehicle that is the leaning vehicle or the straddled vehicle, components are densely arranged below a fuel tank or a seat. Moreover, in a vehicle of a type having a dummy tank, components may sometimes be densely arranged below the dummy tank. In a vehicle of a type having a foot board (for example, a scooter), components may sometimes be densely arranged below the foot board.

As described above, in the vehicle according to PTL 1, the plurality of laser elements and the plurality of drive circuits are unitized, so that aiming for centralization of the vehicle's mass at a location close to the center of gravity of the vehicle can be attempted. This is an ingenuity focusing on the weight, which results in causing another problem, that is, a problem of a size increase of the laser beam source. As mentioned above, components in the body are arranged densely, and therefore it is not easy to provide a solid block of relatively large space for installation of the laser beam source having an increased size. Thus, if the laser beam source having an increased size is installed in a space where the components are arranged densely, a loss of the installation space may be caused, or a layout of components around the laser beam source may be influenced. Consequently, the degree of freedom of arrangement of components in the body is lowered.

The inventors of the present teaching conducted studies about the aforementioned issues, and consequently reached an idea that adoption of a shared driver circuit can be realized by making the plurality of laser elements emit light in the same light-emission manner while a component for changing the light-emission manner of the light-emitting part is separately installed at a different position. The inventors of the present teaching discovered that this can downsize the laser beam source, and can efficiently use an equipment installation space in a vehicle that is a leaning vehicle or a straddled vehicle, to accomplish the present teaching. The present teaching can adopt the laser beam source such that a plurality of light-emitting parts emits light in different light-emission manners, while preventing or suppressing a size increase of the vehicle that is the leaning vehicle or the straddled vehicle. The present teaching adopts the following configuration.

(1) A vehicle that is a leaning vehicle or a straddled vehicle includes:
- a vehicle body that supports a plurality of wheels;
- a plurality of light-emitting parts disposed so as to be visible from the outside of the vehicle;
- one or more laser beam source elements configured as a single light source shared by the plurality of light-emitting parts, to output a laser beam;
- a fiber optic cable that constitutes at least a part of a laser beam path for transmitting the outputted laser beam to each of the plurality of light-emitting parts via a branch portion or a plurality of branch portions;
- a single shared laser driver board that has a single driver circuit that controls the one or more laser beam source elements in common such that the one or more laser beam source elements serve as the single light source that outputs a laser beam to the plurality of light-emitting parts; and one or more laser light-emission-manner converters disposed downstream of a most upstream branch portion or disposed in the most upstream branch portion, the most upstream branch portion being defined as positioned most upstream among the one or more branch portions in a transmission direction of the laser beams, such that the one or more laser light-emission-manner converters cause some light-emitting part(s) out of the plurality of light-emitting parts to emit light in a light-emission manner that bears some difference with that of the other light-emitting parts, wherein at least either of the one or more laser light-emission-manner converters or the one shared laser driver board is at least partially disposed in an in-body covered region, the in-body covered region being disposed further in a downward direction than any one component from among a fuel tank, a dummy tank of which the shape resembles a fuel tank, a foot board, and a seat; the in-body covered region being disposed so as to overlap that one component in a plan view.

The vehicle of (1) described above, which adopts the one or more laser light-emission-manner converters, allows the plurality of light-emitting parts to emit light in different kinds of light-emission manners, while sharing the driver circuit. More specifically, the present teaching includes the single shared laser driver board, and the shared laser driver board has the single driver circuit, which controls the one or more laser beam source elements in common such that the one or more laser beam source elements serve as the single light source that outputs a laser beam to the plurality of light-emitting parts. Since the driver circuit is shared, downsizing of the shared laser driver board is enabled. In addition, the laser beam source elements are shared, too, enabling further downsizing of the laser beam source. The laser light-emission-manner converter is normally smaller in size than equipment of the laser beam source itself. The laser light-emission-manner converter can be installed in the light-emitting part, or can be installed on a path extending from the light source to the light-emitting part, for example. There are few restrictions on a position where a light path is installed, and thus the degree of freedom of installation is high. Accordingly, there are relatively few restrictions on a position where the laser light-emission-manner converter is installed, too.

In the leaning vehicle or the straddled vehicle, components are more densely arranged in the in-body covered region, as compared to in other vehicles. It therefore is difficult to arrange a large-size component in the in-body covered region. In this respect, the foregoing vehicle makes it possible to aim at downsizing of the laser beam source itself, while arranging the laser light-emission-manner converter, which is relatively small in size, separately from the laser beam source. This eliminates the need to provide a relatively large space for installation of the laser beam source in the vehicle that is the leaning vehicle or the straddled vehicle. A loss of the installation space can be suppressed or prevented. In addition, an influence on a layout of configurations around the laser beam source can be suppressed or prevented. Consequently, in the vehicle, the degree of freedom of arrangement of configurations in the body is increased to allow efficient use of an equipment installation space. Accordingly, the foregoing vehicle can adopt the laser beam source such that the plurality of light-emitting parts emits light in different light-emission manners, while preventing or suppressing a size increase of the vehicle that is the leaning vehicle or the straddled vehicle.

An embodiment may adopt the following configuration, for example.

(2) The difference in the light-emission manner may be a difference in at least either one of color or timing, the color being that of the light-emitting part, and the timing being that of when the luminance of the light-emitting part changes, for example. Accordingly, the foregoing vehicle can adopt the laser beam source such that the plurality of light-emitting parts emits light with different colors or at different timings, while preventing or suppressing a size increase of the vehicle that is the leaning vehicle or the straddled vehicle.

(3) The one or more laser light-emission-manner converters are configured without inclusion of being branch portions that causing the light-emitting part(s) to emit light in a light-emission manner that bears some difference with that of the other light-emitting parts.

(4) The one or more laser light-emission-manner converters are color converters for changing the color of light emission in the light-emitting part, and/or light quantity converters for changing the luminance of light emission in the light-emitting part. Accordingly, the foregoing vehicle can adopt the laser beam source such that the plurality of light-emitting parts emits light with different colors and/or at different timings, while preventing or suppressing a size increase of the vehicle that is the leaning vehicle or the straddled vehicle.

(5) The one or more laser light-emission-manner converters are disposed in any of: the laser beam path, the light-emitting part, or an external path, the external path being such through which light emitted by the light-emitting part travels from the light-emitting part to the outside of the vehicle. Thus, the laser light-emission-manner converter can be arranged at a position far from the laser beam source, which contributes to downsizing of the laser beam source unit, for example. Accordingly, the foregoing vehicle can adopt the laser beam source such that the plurality of light-emitting parts emits light in different manners, while more effectively preventing or suppressing a size increase of the vehicle that is the leaning vehicle or the straddled vehicle.

(6) The laser beam path includes the plurality of branch portions, and at least a part of the one or more laser light-emission-manner converters is disposed between the most upstream branch portion and a single branch portion positioned downstream of the most upstream branch portion, or is alternatively disposed together in the single branch portion.

In the vehicle of (6), the light-emission manner of a laser beam is converted by the one or more laser light-emission-manner converters, and then the laser beam passes through the branch portion positioned downstream of the most upstream branch portion, to be divided. In this vehicle, the light-emission manners of the plurality of light-emitting parts provided downstream of this branch portion can all be converted together. It is not necessary to provide the light-emission-manner converter for each of the plurality of light-emitting parts. Accordingly, it is possible to convert the light-emission manners of the plurality of light-emitting parts with a small number of light-emission-manner converters, while preventing or suppressing a size increase of the vehicle that is the leaning vehicle or the straddled vehicle. This configuration is effective in a case of, for example, causing the plurality of light-emitting parts to emit light in the same light-emission manner (like in a flashing light, for example).

In the vehicle of (6) above, at least a part of the one or more laser light-emission-manner converters being "disposed in the single branch portion" means that the one or more laser light-emission-manner converters are disposed inside the branch portion. In such a case as well, laser beams after division in the branch portion have the same light-emission manner. For example, the one or more laser light-emission-manner converters are disposed inside the branch portion and upstream of a branch point.

(7) The laser beam path includes the branch portion comprising plurality of branch portions; the plurality of branch portions includes the most upstream branch portion and a most downstream branch portion, the most downstream branch portion being positioned most downstream among the plurality of branch portions in the transmission direction of the laser beam; and at least a part of the one or more laser light-emission-manner converters is disposed between the most downstream branch portion and a light-emitting part positioned downstream of the most downstream branch portion, or is alternatively disposed together in the most downstream branch portion.

In the vehicle of (7) above, the light-emission manner of a laser beam is converted by the one or more laser light-emission-manner converters, and then the laser beam does not pass through the branch portion but is directly transmitted to the light-emitting part. In this vehicle, it is possible to individually convert the light-emission manner of the light-emitting part provided downstream of the most downstream branch portion. It is possible to cause the plurality of light-emitting parts to emit light in various light-emission manners. Accordingly, it is possible to diversify the light-emission manners of the plurality of light-emitting parts, while preventing or suppressing a size increase of the vehicle that is the leaning vehicle or the straddled vehicle. This configuration is effective in a case of, for example, causing a single light-emitting part to emit light in a light-emission manner different from that of the other light-emitting parts (like in a high beam lamp, a stop lamp, for example).

In the vehicle of (7) above, at least a part of the one or more laser light-emission-manner converters being "disposed in the most downstream branch portion" means that the one or more laser light-emission-manner converters are disposed inside the most downstream branch portion. In such a case as well, laser beams after division in the most downstream branch portion have different light-emission manners. For example, the one or more laser light-emission-manner converters are disposed inside the branch portion and downstream of a branch point.

Regarding the laser beam and the laser beam path, "upstream" indicates optical upstream, and "downstream" indicates optical downstream. That is, upstream indicates a direction toward the light source in the transmission direction of the laser beam, and downstream indicates a direction toward the light-emitting part(s) in the transmission direction of the laser beam.

The vehicle that is the leaning vehicle or the straddled vehicle is, for example, a small-size vehicle having a boarding capacity of one or two persons. The vehicle includes one or two seats for having riders sit thereon, for example. The two seats are disposed one before the other in the front-back direction of the vehicle, for example. The two seats may be formed separately, or may be formed integrally as a single seat component, for example. The maximum length of the seat in a left-right direction is larger than ½ of the maximum length of the vehicle in the left-right direction, for example. The seat is located in a middle portion of the vehicle in the left-right direction. An aspect in which the seat is located in the middle portion of the vehicle in the left-right direction encompasses an aspect in which, for example, the seat overlaps a straight line that passes through the center of the vehicle in the left-right direction and extends in the front-back direction of the vehicle in a plan view. In a plan view of the vehicle, the shared laser driver board is partially or entirely positioned rightward of the left end of the seat, and positioned leftward of the right end of the seat, for example. The opposite end portions of the seat in the left-right direction are supported by a vehicle body frame, which is disposed further in the downward direction than the seat. The vehicle body frame, which supports the seat, includes a left frame portion and a right frame portion, the left frame portion supporting the left end portion of the seat, the right frame portion supporting the right end portion of the seat, for example. In a plan view of the vehicle, the shared laser driver board is partially or entirely positioned rightward of the right end of the left frame portion, and positioned leftward of the left end of the right frame portion, for example. The vehicle includes at least one front wheel and at least one rear wheel, for example. The vehicle includes a drive source that generates power to be transmitted to a wheel, for example. The drive source may be an engine, an electrical motor, or both an engine and an electrical motor, for example. The vehicle includes a power supply that stores electric power for use to output a laser beam, for example. The vehicle includes a steering handle, for example. In a plan view, for example, the length of the steering handle in the left-right direction is larger than ½ of the length of the vehicle in the left-right direction while the steering handle is in a handle neutral position, which is a handle position taken when the vehicle travels straight. Such a steering handle is a bar handle, for example. The bar handle may be a single bar handle extending continuously in the left-right direction of the vehicle, or may include a left bar handle and a right bar handle arranged separately from each other in the left-right direction of the vehicle, for example.

The straddled vehicle is one that includes a seat on which a driver sits in a saddle-straddling fashion, for example. The straddled vehicle is one on which a driver rides in a saddle-straddling fashion, for example. The straddled vehicle is not particularly limited, and examples thereof include motorcycles. The straddled vehicle is not limited to motorcycles, and may be, for example, a three-wheeled motorcycle having three wheels, an all-terrain vehicle (ATV) having four wheels, or a recreational off-highway vehicle (ROV).

The leaning vehicle is one that makes a turn in a leaning posture. The leaning vehicle is configured to lean inward of a curve when making a turn. The leaning vehicle includes a vehicle body that leans inward of a curve when making a turn. The leaning vehicle may serve as the straddled vehicle, too. The leaning vehicle may be, for example, a straddled vehicle configured to lean inward of a curve when making a turn. Examples of such a vehicle include a motorcycle, a three-wheeled motorcycle, and the like. The three-wheeled motorcycle may be a type having two front wheels, or may be a type having two rear wheels. The leaning vehicle may include a seat of sitting-in type, for example.

The vehicle body supports a plurality of wheels, each rotatably. The plurality of wheels includes at least one front wheel and at least one rear wheel, for example. The plurality of wheels is disposed at a distance from each other in the front-back direction of the vehicle, for example. The plurality of wheels includes at least one steered wheel and at least one driving wheel, for example. The steered wheel is steered by a driver of the vehicle manipulating the steering handle, for example. As the steered wheel is steered, the travel direction of the vehicle changes. The driving wheel is rotated by receiving power of a motive power source disposed in the vehicle, for example. As the driving wheel is rotated, the vehicle travels. The vehicle body includes any one of a fuel tank, a dummy tank with a shape resembling the shape of the fuel tank, a foot board, or a seat, for example.

The light-emitting part is configured to receive a laser beam to emit light, or to allow the laser beam to be transmitted therethrough. The light-emitting part is not particularly limited, and for example has at least one of a lens for refracting a laser beam, a reflector for reflecting a laser beam, or a side emitting fiber for emitting a laser beam from a side surface. Of the plurality of light-emitting parts, at least one light-emitting part is disposed such that, for example, a person existing around the vehicle and seeing the vehicle can visually recognize the at least one light-emitting part. Of the plurality of light-emitting parts, at least one light emitting part is disposed such that, for example, a driver of the vehicle can visually recognize the at least one light-emitting part when the driver sees the vehicle. The plurality of light-emitting parts may be disposed further in a forward or rearward direction of the vehicle than the shared laser driver board, or may be distributed such that a part of them is disposed further in the forward direction of the vehicle while another part of them is disposed further in the rearward direction of the vehicle than the shared laser driver board. The part of the plurality of light-emitting parts disposed further in the forward direction of the vehicle than the shared laser driver board is, for example, a headlight, a flashing light, a meter panel light, or the like. The other part of the plurality of light-emitting parts disposed further in the rearward direction of the vehicle than the shared laser driver board is, for example, a tail light, a flashing light, or the like.

The laser beam source element is an electric power-light conversion element. The laser beam source element is supplied with electric power, to output a laser beam. Electric power supplied to the laser beam source element is stored in a battery provided in the vehicle, for example. That is, the laser beam source element is supplied with electric power from the battery provided in the vehicle, to output a laser beam. Regarding the wording "one or more laser beam source elements configured as a single light source shared by the plurality of light-emitting parts, to output a laser beam," a specific aspect thereof is a laser beam source unit including an output part that converges laser beams outputted from the respective laser beam source element, to output a resultant as a single laser beam, for example. Here, the laser beam source unit is one that outputs a laser beam to the outside. The laser beam source unit includes the one or more laser beam source elements and the shared laser driver board, for example. The laser beam source unit further includes a housing for housing the one or more laser beam source elements and the shared laser driver board, for example. The output part mentioned above is provided in the housing, for example. The housing included in the laser beam source unit may have a plurality of output parts, for example. The plurality of output parts is disposed corresponding to the plurality of laser beam source elements, respective, for example. Each of the plurality of output parts outputs a laser beam from its corresponding laser beam source element to the outside of the housing. Even when the plurality of output parts is disposed, a single driver circuit controls each of the plurality of laser beam source elements, so that the plurality of laser beam source elements serves as a single light source that outputs a laser beam.

The fiber optic cable is, for example, disposed so as to connect the plurality of light-emitting parts to the output part described above, and transmits a laser beam outputted from the output part described above to each of the plurality of light-emitting parts. The fiber optic cable may be branched on the way, in a case of connecting the plurality of light-emitting parts to the output parts, which is fewer in number than the plurality of light-emitting parts. The fiber optic cable may connect a single output part to a single light-emitting part corresponding to the single output part, for example.

The driver circuit controls, in common, the one or more laser beam source elements, which supply a laser beam to the plurality of light-emitting parts. Thus, even when the vehicle includes a plurality of laser beam source elements, the plurality of laser beam source elements is controlled by the single driver circuit. That is, the same and single driver circuit controls each of the plurality of laser beam source elements. In a case of the plurality of laser beam source elements being disposed in the shared laser driver board, the plurality of laser beam source elements operates in the same light-emission manners. The light-emission manner of the laser beam source element as stated herein is identical to that of the light-emitting part, for example. The light-emission manner of the laser beam source element includes a color and a timing when the luminance of light emission changes, for example. The light-emission manner of the laser beam source element does not include the luminance, for example.

The shared laser driver board has the single driver circuit described above. Accordingly, efficient use of a space is enabled. This allows the shared laser driver board to still have another driver circuit.

The laser light-emission-manner converter is a component for changing the light-emission manner of the light-emitting part. The laser light-emission-manner converter is, for example, a color converter for changing the color of light to be emitted from the light-emitting part. The color converter is a filter, a phosphor, or the like, for example. The laser light-emission-manner converter is a light quantity converter for changing the luminance of light to be emitted from the light-emitting part, for example. The light quantity converter is an optical switch, for example. The optical switch is a shutter, for example. The shutter may be either of mechanical type or of electric type. For the electric type shutter, a liquid crystal is used, for example. The light quantity converter is, for example, controlled by a control device provided in the vehicle, such that the luminance of light to be emitted from the light-emitting part changes over time. The light quantity converter may change the light quantity of a laser beam in the external path, or may change the light quantity of a laser beam in the laser beam path or in the light-emitting part, for example. In this manner, this light-emitting part can operate such that its luminance changes at a timing different from the timing when the other light-emitting parts change their luminance. The light quantity converter may have a light control function to stepwise-adjust the light quantity of a laser beam. To change the light-emission manner of a single light-emitting part, one or more laser light-emission-manner converters may be provided. In a case of a plurality of laser light-emission-manner converters being provided, all of the laser light-emission-manner converters may be color converters or light quantity converters, or alternatively the plurality of laser light-emission-manner converters may include both a color converter and a light quantity converter. For example, in a case where the light-emitting part is a flashing light, the color converter and the light quantity converter are provided. Regarding the wording "the laser light-emission-manner converter is disposed in the external path," a specific aspect thereof encompasses a color converter disposed at a position that is irradiated with light from the light-emitting part, for example. In this case, the color converter is supported by the vehicle body, for example. Regarding the wording "the laser light-emission-manner converter is supported by the vehicle body," a specific aspect thereof encompasses a laser light-emission-manner converter supported by a vehicle body cover, which constitutes the vehicle body, for example. The vehicle body cover is supported by a vehicle body frame, which constitutes the vehicle body. The vehicle, for example, includes a laser beam source unit, and is configured such that the volume of at least the laser light-emission-manner converter included in the vehicle is less than the volume of the laser beam source unit. The laser beam source unit as stated herein includes the one or more laser beam source elements, the shared laser driver board, and a housing for housing them. Equipment or a component for branching the laser beam path does not correspond to the laser light-emission-manner converter. In a specific example, a branch portion of the fiber optic cable does not correspond to the laser light-emission-manner converter. In this respect, however, if equipment or a component for branching the laser beam path is configured to change the light quantity of a laser beam to be distributed to each of the plurality of light-emitting parts, the equipment or the component functions as the light quantity converter. The laser light-emission-manner converter may not always have to include an outer lens, for example. The outer lens is included in the light-emitting part, for example. The outer lens is disposed in lighting equipment of the vehicle, for example. The outer lens forms an external appearance of the vehicle, for example. The outer lens outputs a laser beam received by the light-emitting part, to the outside of the vehicle, for example. The outer lens refracts and/or transmits therethrough a laser beam received by the light-emitting part, for example.

The branch portion is disposed in the laser beam path, which extends from the light source to the plurality of light-emitting parts, for example. The branch portion is disposed in the laser beam path, which extends from the laser beam source unit to the plurality of light-emitting parts, for example. The branch portion branches the fiber optic cable, for example. The branch portion is an optical connector, an optical coupler, or the like, for example. The number of fiber optic cables downstream of the branch portion is more than the number of fiber optic cables upstream of the branch portion. The branch portion branches a fiber optic cable such that the number of fiber optic cables connected to the branch portion from upstream can increase, for example. The branch portion branches a fiber optic cable such that the fiber optic cable extends further in the leftward direction than the center of the vehicle body and further in the rightward direction than the center of the vehicle body in the left-right direction, for example. The branch portion branches a fiber optic cable such that the fiber optic cable extends further in the forward direction than the center of the vehicle body and further in the rearward direction than the center of the vehicle body in the front-back direction, for example. The branch portion does not encompass untying at least one of bundled fiber optic cables from the bundle of the fiber optic cables.

The in-body covered region is disposed further in the downward direction than any one component from among a fuel tank, a dummy tank with a shape resembling the shape of the fuel tank, a foot board, and a seat, the in-body covered region overlapping the one component in a plan view. The fuel tank is disposed between the seat and the steering handle in the front-back direction of the vehicle so as to form an external appearance of an upper surface of the vehicle, for example. The fuel tank is disposed at a position where the fuel tank can be knee-gripped by the driver while the driver is riding, for example. The fuel tank is disposed at a position where the fuel tank is visibly concealed from the outside, for example. The dummy tank is disposed instead of a fuel tank and at a position where the fuel tank is supposed to be disposed, for example. The dummy tank is disposed at a position where the dummy tank can be knee-gripped by the driver while the driver is riding, for example. The foot board, which is a component included in a scooter-type vehicle, is disposed at the feet of the driver. The foot board is a component on which the driver places their feet while the driver is riding. The seat may be one for a single passenger, or may be one for two passengers (a driver's seat and a fellow passenger's seat; that is, a tandem seat). The seat is a component including a portion on which the driver sits while riding. The fuel tank, the dummy tank, the foot board, and the seat are entirely or partially disposed between the front end of the front wheel and the rear end of the rear wheel in the front-back direction of the vehicle, for example. The fuel tank, the dummy tank, the foot board, and the seat are entirely or partially disposed between a rotation shaft of the front wheel and a rotation shaft of the rear wheel in the front-back direction of the vehicle, for example. The fuel tank, the dummy tank, the foot board, and the seat are entirely or partially disposed between the rear end of the front wheel and the front end of the rear wheel in the front-back direction of the vehicle, for example. In such an in-body covered region, components are arranged densely, and therefore efficient use of an installation space within the space is preferred in the vehicle that is the leaning vehicle or the straddled vehicle. The light-emission-manner converter and/or the shared laser driver board, which is/are partially or entirely arranged in the in-body covered region, is/are disposed so as to be visibly concealed from the outside in a plan view of the vehicle. The light-emission-manner converter and/or the shared laser driver board, which is/are partially or entirely arranged in the in-body covered region, is/are disposed so as to be visibly concealed from the outside in a side view of the vehicle. At least a part of a component that is partially or entirely arranged in the in-body covered region (which means the light-emission-manner converter and/or the shared laser driver board) overlaps any of the plurality of wheels when viewed in a direction perpendicular to the left-right direction of the vehicle, for example. At least a part of a component that is partially or entirely arranged in the in-body covered region (which means the light-emission-manner converter and/or the shared laser driver board) is positioned further in the upward direction than the plurality of wheels in a side view or a front view of the vehicle, for example. At least a part of a component (which means the light-emission-manner converter and/or the shared laser driver board) that is partially or entirely arranged in the in-body covered region may be positioned further in the downward direction than the upper end of each of the plurality of wheels in a side view or a front view of the vehicle, for example. At least a part of a component (which means the light-emission-manner converter and/or the shared laser driver board) that is partially arranged in the in-body covered region is positioned further in the rightward direction than the left end of the steering handle and further in the leftward direction than the right end of the steering handle in a plan view or a front view of the vehicle. The in-body covered region is positioned further in the rightward direction than the left end of the steering handle and further in the leftward direction than the right end of the steering handle in a plan view, for example.

No limitation is put on combining configurations according to the other aspects described above. Before detailed descriptions of embodiments, it should be understood that the present teaching is not limited to the details of the configuration and arrangement of elements shown in the description below or illustrated in the drawings. The present teaching may be carried out in other embodiments, and may be carried out in embodiments having various modifications. The present teaching can be carried out in appropriate combinations of variations given below.

Advantageous Effects of Invention

The present teaching can efficiently use an equipment installation space in a vehicle that is a leaning vehicle or a straddled vehicle, to prevent or suppress a size increase of the vehicle, while enabling adoption of a laser beam source.

BRIEF DESCRIPTION OF DRAWINGS

FIG. 2(a) is a side view of a straddled vehicle according to a variation of the embodiment of the present teaching; and FIG. 2(b) is a side view of a straddled vehicle according to a variation different from the variation shown in FIG. 2(a).

FIGS. 4(a) and (b) are block diagrams showing variations of arrangement of a laser light-emission-manner converter.

DESCRIPTION OF EMBODIMENTS

In the following, details of a straddled vehicle according to an embodiment of the present teaching will be described with reference to the drawings. The embodiment described below is just an example. It should be noted that the embodiment described below never limits the interpretation of the present teaching.

Figure 1:
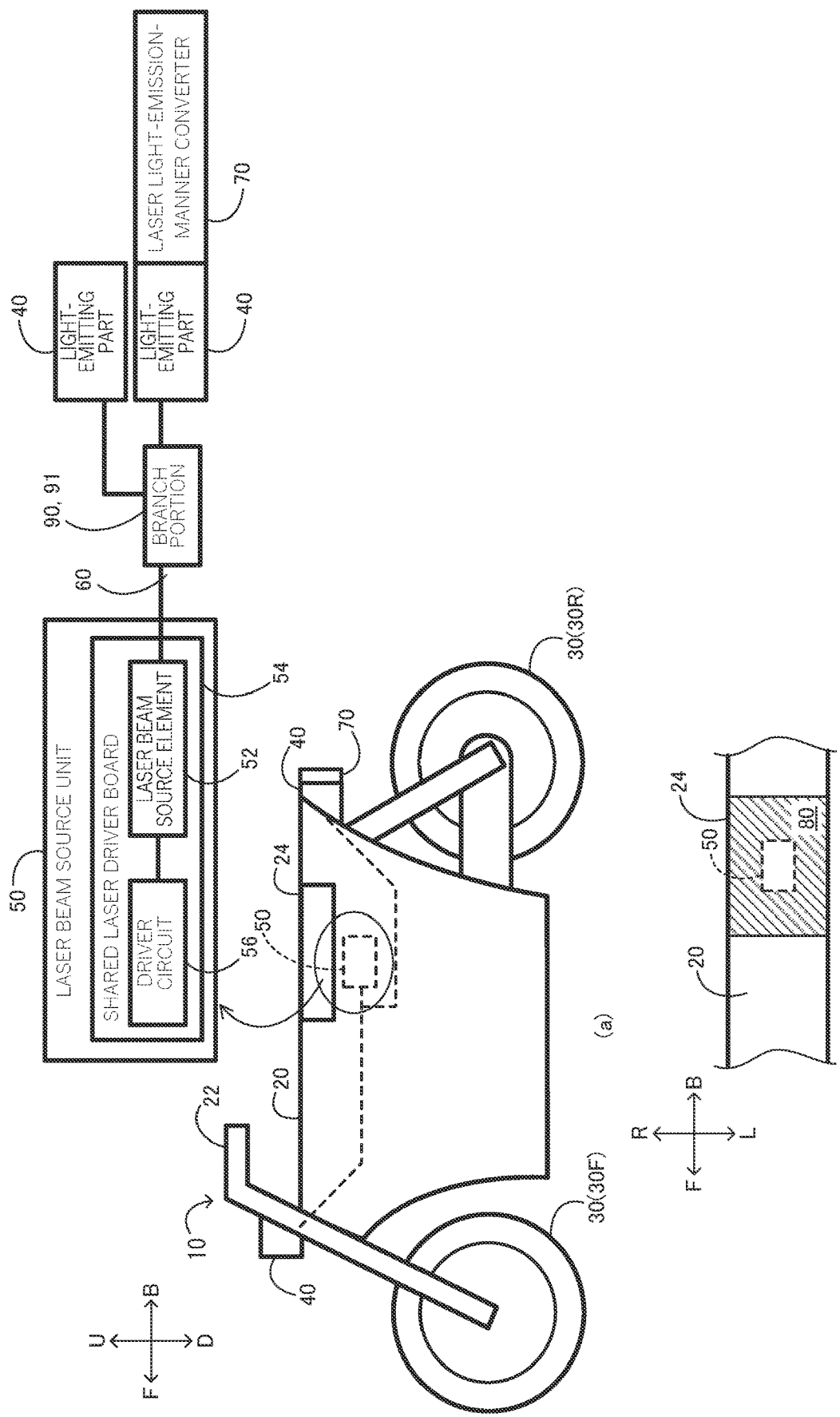
FIG. 1(a) shows a side view of a straddled vehicle according to an embodiment of the present teaching, in conjunction with a block diagram showing a laser beam source unit.
FIG. 1(b) is a plan view showing an example of an in-body covered region.

Referring to FIG. 1(a), a straddled vehicle 10 according to an embodiment of the present teaching will be described. The straddled vehicle 10 includes a vehicle body 20, a bar handle 22, a seat 24, a plurality of wheels 30, a plurality of light-emitting parts 40, a laser beam source unit 50, a fiber optic cable 60, and a single laser light-emission-manner converter 70.

The vehicle body 20 supports the bar handle 22 rotatably. The vehicle body 20 supports the seat 24. A driver of the straddled vehicle 10 sits on the seat 24 while driving the straddled vehicle 10. When the straddled vehicle 10 turns in a left direction L, the vehicle body 20 leans in the left direction L, and when the straddled vehicle 10 turns in a right direction R, the vehicle body 20 leans in the right direction R. Various directions in the straddled vehicle 10 are defined on the basis of the driver sitting on the seat 24.

The vehicle body 20 supports the plurality of wheels 30. When the straddled vehicle 10 turns in the left direction L, the plurality of wheels 30 lean in the left direction L together with the vehicle body 20, and when the straddled vehicle 10 turns in the right direction R, the plurality of wheels 30 lean in the right direction R together with the vehicle body 20. The plurality of wheels 30 include a front wheel 30F as a steered wheel, and a rear wheel 30R as a driving wheel. A manipulation on the bar handle 22 by the driver of the straddled vehicle 10 is mechanically transmitted to the front wheel 30F as the steered wheel, so that the front wheel 30F as the steered wheel is steered in accordance with the manipulation. The rear wheel 30R as the driving wheel is rotated by receiving power of a power unit (not shown), which is supported by the vehicle body 20, to make the straddled vehicle 10 travel.

The plurality of light-emitting parts 40 are disposed so as to be visible from the outside of the vehicle. The plurality of light-emitting parts 40 include a headlight, a tail light, a flasher, and the like, for example.

Figure 3:
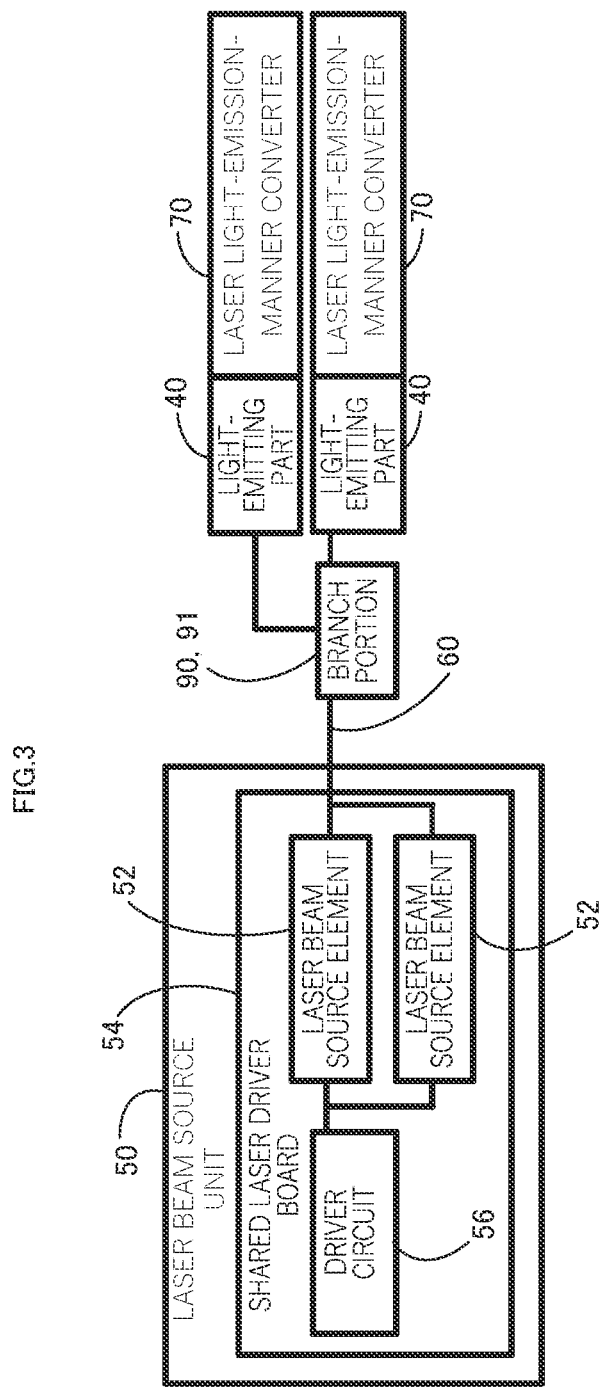
FIG. 3 is a block diagram showing a laser beam source unit different from the laser beam source unit shown in FIG. 1.

The laser beam source unit 50 produces a laser beam to be outputted to the plurality of light-emitting parts 40, and outputs the laser beam thus produced to the plurality of light-emitting parts 40. The laser beam source unit 50 includes a single laser beam source element 52 and a single shared laser driver board 54. A case of the laser beam source unit 50 including two or more laser beam source elements 52 is illustrated in FIG. 3. The laser beam source element 52 is configured as a single light source shared by the plurality of light-emitting parts 40, to output a laser beam. The shared laser driver board 54 has a single driver circuit 56. The driver circuit 56 controls the laser beam source element 52 in common such that the laser beam source element 52 serves as a single light source that outputs a laser beam to the plurality of light-emitting parts 40.

The fiber optic cable 60 constitutes at least a part of a laser beam path for transmitting an outputted laser beam to each of the plurality of light-emitting parts 40 via a branch portion or a plurality of branch portions 90. The fiber optic cable 60 connects the laser beam source unit 50 to the plurality of light-emitting parts 40. The fiber optic cable 60 is branched on the way.

The single laser light-emission-manner converter 70 is disposed in order to cause some light-emitting parts 40 out of the plurality of light-emitting parts 40 to emit light in a light-emission manner different from that of the other light-emitting parts 40. A case of the straddled vehicle 10 including two or more laser light-emission-manner converters 70 is illustrated in FIG. 3. The single laser light-emission-manner converter 70 is disposed downstream of the most upstream branch portion 91, which is positioned most upstream among the one or more branch portions 90 in a laser beam transmission direction, or is disposed in the most upstream branch portion 91. In this embodiment, only a single branch portion 90 is shown, and therefore the branch portion 90 corresponds to the most upstream branch portion 91. The laser light-emission-manner converter 70 is, for example, a component that changes the color of light emitted by the light-emitting part 40 as the tail light. A difference in the light-emission manner is a difference in at least one of the color of light emission in the light-emitting part 40 or a timing when the luminance of light emission in the light-emitting part 40 changes, for example. One or more laser light-emission-manner converters 70 are not a branch portion for causing some of the light-emitting parts 40 to emit light in a light-emission manner different from that of the other light emitting-parts 40. The laser light-emission-manner converter 70 is a color converter for changing the color of light emission in the light emitting-part 40, or a light quantity converter for changing the luminance of light emission in the light-emitting-part 40. The laser light-emission-manner converter 70 is disposed in any of the laser beam path, the light-emitting part 40, or an external path. The external path is a path through which light emitted by the light-emitting part 40 travels from the light-emitting part 40 to the outside of the vehicle.

Referring to FIG. 1(b), at least one of the laser light-emission-manner converter 70 or the shared laser driver board 54 is at least partially disposed in an in-body covered region 80. The in-body covered region 80 is disposed further in the downward direction than the seat 24 so as to overlap the seat 24 in a plan view.

The straddled vehicle 10, which adopts the laser light-emission-manner converter 70, allows the plurality of light-emitting parts 40 to emit light in different kinds of light-emission manners, while sharing the driver circuit 56. More specifically, the straddled vehicle 10 includes the one shared laser driver board 54, and the shared laser driver board 54 has the single driver circuit 56, which controls the single laser beam source element 52 in common such that the single laser beam source element 52 serves as the single light source that outputs a laser beam to the plurality of light-emitting parts 40. Since the driver circuit 56 is shared, downsizing is enabled. In addition, the laser beam source element 52 is shared, too. Downsizing of the laser beam source unit 50 is enabled. The laser light-emission-manner converter 70 has a size smaller than that of the laser beam source unit 50. The laser light-emission-manner converter 70 can be installed in the light-emitting part 40, or can be installed on a path extending to the light-emitting part 40, for example. There are few restrictions on a position where a light path is installed, and thus the degree of freedom of installation is high. Accordingly, there are relatively few restrictions on a position where the laser light-emission-manner converter 70 is installed, too.

As thus far described, it is possible to aim at downsizing of the laser beam source unit 50, while arranging the laser light-emission-manner converter 70, which has a relatively small size, separately from the laser beam source unit 50. This eliminates the need to provide a relatively large space for installation of the laser beam source unit 50 in the straddled vehicle 10. A loss of the installation space can be suppressed or prevented. An influence on a layout of configurations around the laser beam source unit 50 can be suppressed or prevented. Consequently, in the straddled vehicle 10, the degree of freedom of arrangement of configurations in the vehicle body 20 is increased to allow efficient use of an equipment installation space. Accordingly, the straddled vehicle 10 can adopt the laser beam source unit 50 such that the plurality of light-emitting parts 40 emit light in different light-emission manners, while preventing or suppressing a size increase of the straddled vehicle 10.

[Variations of In-body Covered Region]

For example, in a straddled vehicle 10A shown in FIG. 2(a), the in-body covered region 80 may be disposed further in the downward direction than a foot board 26 so as to overlap the foot board 26 in a plan view.

Alternatively, in a straddled vehicle 10B shown in FIG. 2(b), the in-body covered region 80 may be disposed further in the downward direction than a fuel tank 28 so as to overlap the fuel tank 28 in a plan view. The fuel tank 28 may be a dummy tank.

[Variations of Arrangement of Laser Light-Emission-Manner Converter]

For example, in a case of the laser beam path (fiber optic cable 60) including a plurality of branch portions 90 as shown in FIG. 4(a), at least some of the one or more laser light-emission-manner converters 70 may be disposed between the most upstream branch portion 91 and a single branch portion 90 positioned downstream of the most upstream branch portion 91, or may be disposed in the single branch portion 90. In such a case, the laser light-emission-manner converter 70 is able to cause some light-emitting parts 40B to 40E out of the plurality of light-emitting parts 40A to 40E to emit light in a light-emission manner different from that of the other light-emitting part 40A. That is, the laser light-emission-manner converter 70 can all convert together the light-emission manner of the light-emitting parts 40B to 40E. The light-emitting parts 40B, 40C are a pair of left and right front flashers, for example. The light-emitting parts 40D, 40E are a pair of left and right rear flashers, for example.

For example, in a case of the laser beam path (fiber optic cable 60) including a plurality of branch portions 90 as shown in FIG. 4(b), the plurality of branch portions 90 may include the most upstream branch portion 91 and the most downstream branch portion 92, which is positioned most downstream among the plurality of branch portions 90 in the laser beam transmission direction. In such a case, at least some of the one or more laser light-emission-manner converters 70 may be disposed between the most downstream branch portion 92 and a light-emitting part 40 positioned downstream of the most downstream branch portion 92, or may be disposed in the most downstream branch portion 92. In such a case, the laser light-emission-manner converter 70 is able to cause some light-emitting part 40H out of a plurality of light-emitting parts 40F to 40I to emit light in a light-emission manner different from that of the other light-emitting parts 40F, 40G, 40I. That is, the laser light-emission-manner converter 70 can all convert together the light-emission manner of the light-emitting part 40H. The light-emitting part 40H is a high beam lamp, for example. The light-emitting part 40G, which is positioned at the destination of a path that is branched from a laser beam path leading to the light-emitting part 40H by the most downstream branch portion 92, is a low beam lamp, for example.

OTHER EMBODIMENTS

The embodiment and variation, of which at least either one of description or illustration has been given herein, are for ease of understanding the present disclosure, and not for limiting the concept of the present disclosure. The foregoing embodiment and variation may be altered and/or adapted without departing from the spirit of the present disclosure. The spirit encompasses equivalent elements, modifications, omissions, combinations (for example, a combination of a feature of the embodiment and a feature of any variation), adaptations and/or alterations as would be appreciated by those skilled in the art based on the embodiment disclosed herein. The limitations in Claims are to be interpreted broadly based on the language employed in Claims and not limited to embodiments and variations described herein or during the prosecution of the present application. The embodiments and variations are to be construed as non-exclusive. For example, in this Description, the terms "preferably," "may," and "possible" are non-exclusive and mean "preferably, but not limited to," "may, but not limited to," and "possibly, but not limited to," respectively.

REFERENCE SIGNS LIST 10 straddled vehicle
20 vehicle body 22 bar handle
24 seat
26 foot board
28 fuel tank
30 wheel
40 light-emitting part
50 laser beam source unit
52 laser beam source element
54 shared laser driver board
56 driver circuit
60 fiber optic cable
70 laser light-emission-manner converter
80 in-body covered region
90 branch portion
91 most upstream branch portion
92 most downstream branch portion

The invention claimed is:

1. A vehicle that is a leaning vehicle or a straddled vehicle having a plurality of wheels, a fuel tank, a dummy tank, a foot board, and a seat, the vehicle comprising:
   a vehicle body that supports the plurality of wheels;
   a plurality of light-emitting parts, each configured to emit light in a light-emission manner so as to be visible from an outside of the vehicle;
   a single light source including one or more laser beam source elements, the single light source being configured to output a laser beam to the plurality of light-emitting parts;
   a fiber optic cable that constitutes at least a part of a laser beam path, which is a path for the laser beam to be transmitted from the single light source to the plurality of light-emitting parts, the fiber optic cable having at least one branch portion each branching the laser beam passing therethrough, the at least one branch portion including a most upstream branch portion that is positioned most upstream in a transmission direction of the laser beam;
   a single shared laser driver board that has a single driver circuit that controls the one or more laser beam source elements; and
   at least one laser light-emission-manner converter, each disposed in, or downstream of, the most upstream branch portion, to thereby cause each of the plurality of light-emitting parts downstream from said each light-emission-manner converter to change the light-emission manner thereof, wherein
   either the at least one laser light-emission-manner converter or the single shared laser driver board is, or both are, at least partially disposed in an in-body covered region, which is disposed further downward than, and in a plan view of the vehicle overlaps, any of the fuel tank, the dummy tank, the foot board, and the seat.

2. The vehicle according to claim 1, wherein
the change of the light-emission manner is in at least one of
   a color of said each light-emitting part, or
   a timing when a luminance of said each light-emitting part changes.

3. The vehicle according to claim 1, wherein
each of the at least one laser light-emission-manner converter is different from any of the at least one branch portion.

4. The vehicle according to claim 1, wherein
the at least one laser light-emission-manner converter includes a color converter for changing a color of light emission, and/or a light quantity converter for changing a luminance of light emission.

5. The vehicle according to claim 1, wherein
each of the at least one laser light-emission-manner converter is disposed in the laser beam path, in one of the plurality of light-emitting parts, or in an external path, wherein
the external path is a path through which light emitted by any of the light-emitting parts travels from said any light-emitting part to the outside of the vehicle.

6. The vehicle according to claim 1, wherein
the at least one branch portion includes a plurality of branch portions, and
the at least one laser light-emission-manner converter is partially disposed between the most upstream branch portion and one of the branch portions positioned downstream of the most upstream branch portion, or is alternatively entirely disposed in said one branch portion.

7. The vehicle according to claim 1, wherein
the at least one branch portion includes a plurality of branch portions,
the plurality of branch portions further includes a most downstream branch portion, which is positioned most downstream in the transmission direction of the laser beam, and
the at least one laser light-emission-manner converter is partially disposed between the most downstream branch portion and one of the light-emitting parts positioned downstream of the most downstream branch portion, or is alternatively entirely disposed in the most downstream branch portion.

* * * * *